US012657890B2

(12) United States Patent
Kotagiri et al.

(10) Patent No.: US 12,657,890 B2
(45) Date of Patent: Jun. 16, 2026

(54) ANNOTATION VERIFICATION METHOD, ANNOTATION VERIFICATION APPARATUS, AND NON-TRANSITORY COMPUTER READABLE RECORDING MEDIUM

(71) Applicant: WOVEN BY TOYOTA, INC., Tokyo (JP)

(72) Inventors: Dheeraj Kotagiri, Koto-ku (JP); Florin Baiduc, Chiba (JP); Ezequiel Castellano, Meguro-ku (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 276 days.

(21) Appl. No.: 18/609,595

(22) Filed: Mar. 19, 2024

(65) Prior Publication Data

US 2024/0386709 A1 Nov. 21, 2024

(30) Foreign Application Priority Data

May 17, 2023 (JP) ................................. 2023-081699

(51) Int. Cl.
| | |
|---|---|
| G06V 10/776 | (2022.01) |
| G06T 7/50 | (2017.01) |
| G06T 7/70 | (2017.01) |
| G06V 10/764 | (2022.01) |
| G06V 10/98 | (2022.01) |
| G06V 20/70 | (2022.01) |

(52) U.S. Cl.
CPC .............. *G06V 10/776* (2022.01); *G06T 7/50* (2017.01); *G06T 7/70* (2017.01); *G06V 10/764* (2022.01); *G06V 10/98* (2022.01); *G06V*

*20/70* (2022.01); *G06T 2207/10016* (2013.01); *G06T 2207/30252* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 10,621,495 B1 * | 4/2020 | Huval | ...................... | G06N 3/08 |
| 10,977,518 B1 * | 4/2021 | Sharma | ................ | G06V 10/764 |

(Continued)

FOREIGN PATENT DOCUMENTS

JP 2022-043364 A 3/2022

*Primary Examiner* — Scott A Rogers
(74) *Attorney, Agent, or Firm* — Sughrue Mion, PLLC

(57) ABSTRACT

The present disclosure is to provide an annotation verification method. In the annotation verification method, a first result which is a verified result of the annotation for a first image sequence included in the image sequence is acquired. Next, first reference information regarding a position of the specified target object range in each image included in the first image sequence is acquired based on the first result. Next, a position of the target object range in a target image is predicted based on reference information including the first reference information. Next, an actually-specified position of the target object range in the target image is acquired based on the result of the annotation for the target image. Then, the result of the annotation for the target image is verified by comparing the target object range at the predicted position and the target object range at the actually-specified position.

10 Claims, 14 Drawing Sheets

(56)  References Cited

U.S. PATENT DOCUMENTS

| 11,636,686 | B2 * | 4/2023 | Westmacott | ........... | G06V 20/40 |
| | | | | | 382/103 |
| 11,941,838 | B2 * | 3/2024 | Liu | ......................... | G06V 20/46 |
| 12,002,191 | B2 * | 6/2024 | Tanaka | ....................... | G06T 7/11 |
| 12,367,673 | B1 * | 7/2025 | Goldenberg | ........... | G06V 20/41 |

* cited by examiner

20 k          # k+1          # k+2

21          21          21

NOT ANOMALY

ANOMALY

ANNOTATION VERIFICATION METHOD, ANNOTATION VERIFICATION APPARATUS, AND NON-TRANSITORY COMPUTER READABLE RECORDING MEDIUM

CROSS-REFERENCE TO RELATED APPLICATION

The present disclosure claims priority to Japanese Patent Application No. 2023-081699, filed on May 17, 2023, the contents of which application are incorporated herein by reference in their entirety.

TECHNICAL FIELD

The present disclosure relates to a technique for verifying a result of an annotation on an image sequence.

BACKGROUND ART

Machine learning models that perform object detection and the like using images as input are trained using annotated images as training data. It is known that performances of such machine learning models depend largely on qualities of annotations of the training data. Therefore, techniques are being considered to ensure the quality of annotations in the training data.

For example, Patent Literature 1 discloses a technique for suppressing a decrease in object detection accuracy when learning is performed using a dataset includes images that have not been appropriately annotated.

LIST OF RELATED ART

Patent Literature 1: JP 2022/043364 A

SUMMARY

The quality of an annotation depends on the work of an annotator. Due to errors in the annotator's work, or due to the work of a malicious annotator, the result of the annotation may include an abnormal annotation.

In particular, in annotation for image sequence, the abnormal annotation of some images included in the image sequence is a factor of significantly deteriorating the quality of the annotation. However, an image sequence is generally composed of many images, and it takes a lot of labor to manually verify an annotation result for each image included in image sequence. An object of the present disclosure is to provide a technique, with respect to an annotation for an image sequence, capable of easily and appropriately verifying a annotation result for each image included in the image sequence.

A first aspect of the present disclosure relates to an annotation verification method for an image sequence, the annotation being a process of specifying a target object range surrounding a target object in each image included in the image sequence by an annotator.

The annotation verification method, which is executed by a computer, comprises:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

A second aspect of the present disclosure relates to an annotation verification apparatus of verifying a result of annotation for an image sequence, the annotation being a process of specifying a target object range surrounding a target object in each image included in the image sequence by an annotator.

The annotation verification apparatus comprises one or more processors.

The one or more processors are configured to execute:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

A third aspect of the present disclosure relates to an annotation verification program for verifying a result of annotation for an image sequence is recorded, the annotation being a process of specifying a target object range surrounding a target object in each image included in the image sequence by an annotator.

The annotation verification program, when executed by a computer, causes the computer to execute:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

According to the present disclosure, first reference information is acquired. The first reference information regards a position of a target object range in each image included in a first image sequence is obtained. Further, a predicted position of the target object range in a target image is calculated based on reference information including the first reference information. The target image is an image adjacent to the first image sequence. Then, the annotation result on the target image is verified by comparing the target object range at the predicted position with the target object range at an actually-specified position in the annotation result. It is thus possible to easily and appropriately verify the annotation result for each image included in the image sequence.

DETAILED DESCRIPTION

Hereinafter, embodiments will be described with reference to the drawings.

1. First Embodiment

1-1. Outline

Figure 1:
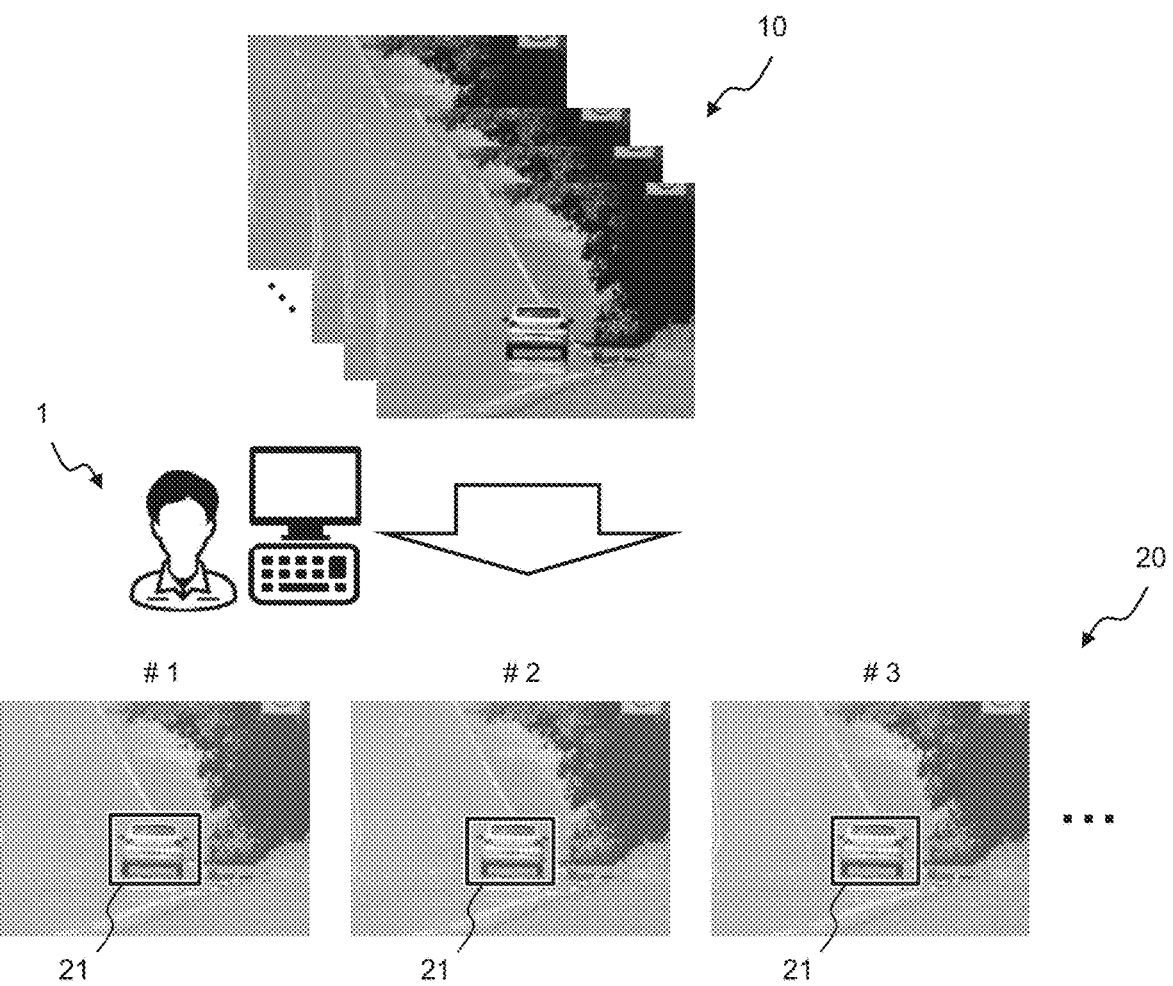
FIG. 1 is a conceptual diagram for explaining a result of annotation on an image sequence.

An annotation verification method according to the present embodiment is performed to verify a result of an annotation on an image sequence. FIG. 1 is a conceptual diagram for explaining an annotation result 20 for an image sequence 10.

The image sequence 10 is composed of a series of images having a predetermined order. The image sequence 10 is typically video data continuously captured by a camera. In this case, each image included in the image sequence 10 is a frame of the video data. In addition, the order of the images included in the image sequence 10 is an order corresponding to the time at which the images are captured. In the following description, the number of images included in the image sequence 10 is denoted by N, and the order of each image included in the image sequence 10 is denoted by the number #1, #2, #3, . . . , #N.

The image sequence 10 may be captured by a camera fixed at a predetermined position, such as a monitoring camera or a live camera. Or the image sequence 10 may be captured by a camera mounted on a moving body (such as a vehicle or a drone), such as an in-vehicle camera (hereinafter, referred to as a "onboard camera").

The image sequence 10 may further include data representing additional information about each image (hereinafter referred to as "additional data"). Examples of the additional data include depth information of each image, information of the imaging time of each image, and information of the imaging point of each image.

The annotation on the image sequence 10 is a process in which an annotator 1 specifies a rage surrounding a target object (hereinafter, referred to as a "target object range") for each image included in the image sequence 10. In the present embodiment, the annotator 1 may not be a human. For example, the annotation on the image sequence 10 may be mechanically performed.

In FIG. 1, a bounding box 21 surrounding a vehicle reflected in the image is shown as the annotation result 20. That is, in FIG. 1, the target object is the vehicle, and the target object range is the bounding box 21.

The target object is usually determined as appropriate according to the contents of the image sequence 10, the purpose of the annotation, and the like. For example, when annotation is performed for the purpose of creating training data for a machine learning model for detecting a person, the target object is considered to be a person. In the present embodiment, the form of the target object range is not limited to the bounding box 21. For example, the target object range may be a polygon or a segmentation. In the following, an annotation in which the target object range is the bounding box 21 will be described as an example.

The annotation result 20 is managed as data. The annotation result 20 may be referred to as "annotation data". The annotation result 20 includes at least position information of the bounding box 21 specified in each image. For example, the position information is the coordinate positions of the four corners (the upper left corner, the upper right corner, the lower left corner, and the lower right corner) and the centroid of the bounding box 21 specified in each image. Furthermore, the annotation result 20 may include class information (vehicle, person, airplane, etc.) of the target object, attribute information (identification number, past record of annotation, etc.) of the annotator 1, and the like.

The annotation result 20 is added to the image sequence 10. The image sequence 10 to which the annotation result 20 is added may be used as training data.

Figure 2:
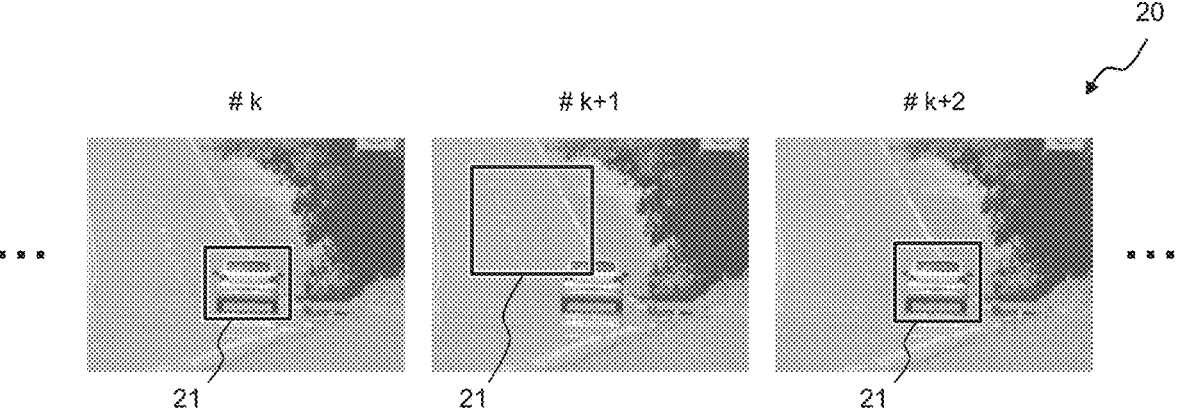
FIG. 2 is a conceptual diagram showing an example of an annotation result including an abnormal annotation.

The annotation result 20 may include an abnormal annotation due to errors in the annotator 1's work or due to the malicious annotator 1's work. FIG. 2 is a conceptual diagram showing an example of the annotation result 20 including an abnormal annotation. In the annotation result 20 shown in FIG. 2, an abnormal annotation is performed on the image #k+1. Using training data created by the annotation result 20 including such abnormal annotations is a factor of deteriorating the performance of the machine learning model trained. Furthermore, when a system related to an autonomous driving vehicle or the like is realized by the machine learning model, the security of the system may be reduced.

In addition, in the annotation for the image sequence 10, the inclusion of such abnormal annotations in the annotation result 20 locally impairs the consistency of the annotation. For example, in the example shown in FIG. 2, three consecutive images #k, #k+1, and #k+2 consecutively show a vehicle traveling on a road. Thus, an annotation for the three consecutive images #k, #k+1, and #k+2 are expected to be consistently performed to track the vehicle. However, in the example shown in FIG. 2, the position of the bounding box 21 in the image #k+1 is largely deviated from the vehicle. Therefore, in the annotation result 20 shown in FIG. 2, the consistency of the annotation is impaired with respect to the three consecutive images #k, #k+1, and #k+2.

When the image sequence 10 is used as training data, such locally impaired annotation consistency is also a factor deteriorating the performance of the machine learning model.

The annotation verification method according to the present embodiment enables verification of the presence or absence of an abnormal annotation with respect to the annotation result 20 for the image sequence 10. Furthermore, the annotation verification method according to the present embodiment enables verification of local consistency of an annotation.

Figure 3:
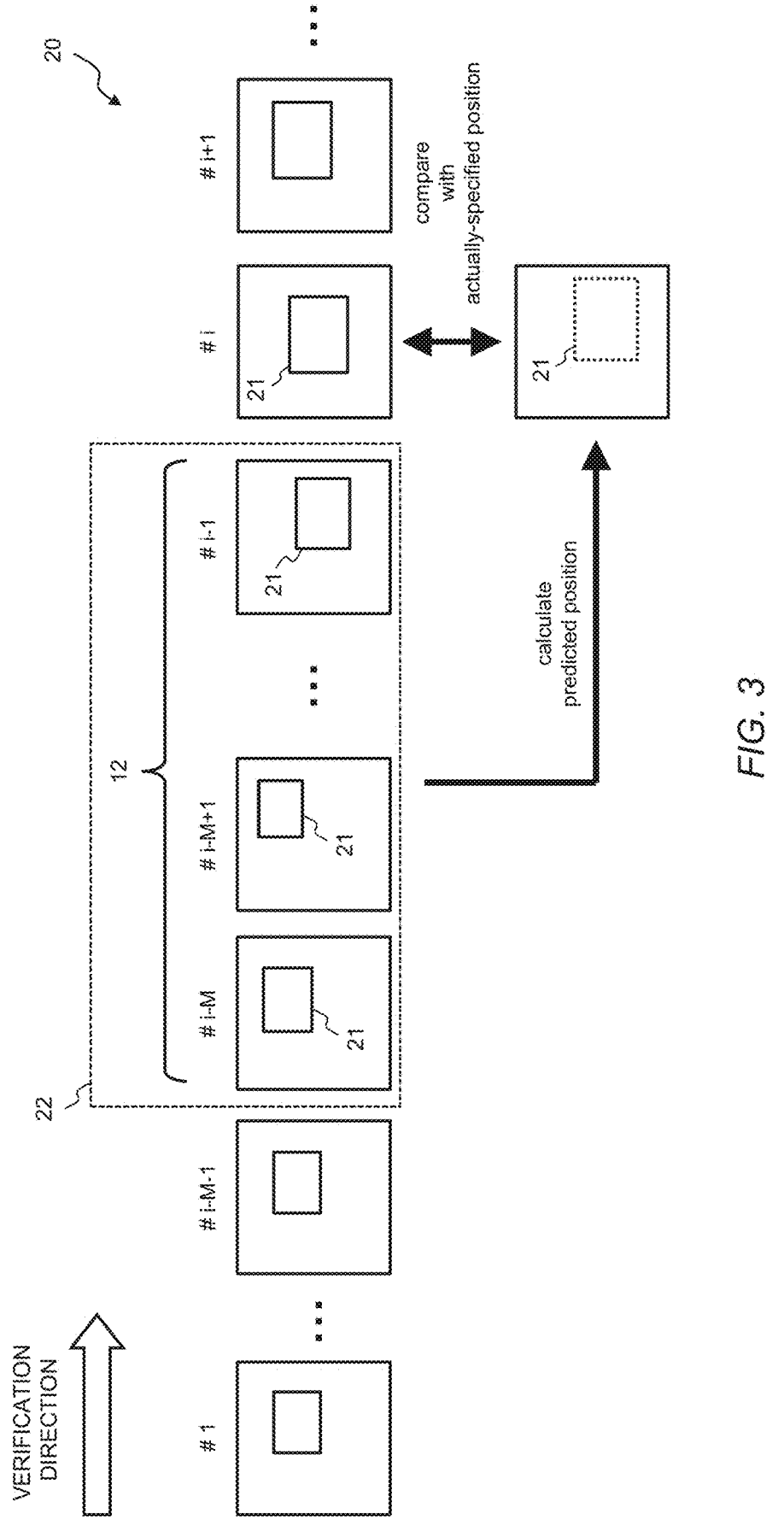
FIG. 3 is a conceptual diagram for explaining an outline of an annotation verification method according to the present embodiment.

Hereinafter, an outline of the annotation verification method according to the present embodiment will be described with reference to FIG. 3.

The annotation verification method according to the present embodiment sequentially verifies the annotation result 20 for each image included in the image sequence 10 in accordance with a predetermined verification direction. In FIG. 3, the verification directions are in ascending order. This is a direction of verifying images from the past to the future when the image sequence 10 is video data. The verification direction may be in descending order. Alternatively, the verification direction may be a direction in which the images are verified in descending order and ascending order from the intermediate image toward the image #1 and the image #N.

Hereinafter, the image whose annotation result 20 is to be verified will be referred to as a "target image". In FIG. 3, a case where the image #i is set as the target image will be described. That is, it is assumed that the images up to #i−1 have been verified.

In the annotation verification method according to the present embodiment, first, verified annotation results 22 (hereinafter, referred to as a "first result 22") for a partial image sequence 12 (hereinafter, referred to as a "first image sequence 12") included in the image sequence 10 is acquired. In particular, the first image sequence 12 is a partial image sequence adjacent to the target image. The size of the first image sequence 12 may be determined in advance. In FIG. 3, the size of the first image sequence 12 is M. That is, in FIG. 3, the first image sequence 12 is M consecutive images from #i−M to #i−1.

Information (hereinafter, referred to as "first reference information") regarding the position of the bounding box 21 in each image included in the first image sequence 12 is at least acquired from the first result 22. For example, the first reference information is information on the coordinate positions of the four corners and the centroid of the bounding box 21 in each image included in the first image sequence 12.

Next, in the annotation verification method according to the present embodiment, the position of the bounding box 21 in the target image is predicted based on information including the first reference information (hereinafter, simply referred to as "reference information"). In FIG. 3, the bounding box 21 at the predicted position is indicated by a dotted line. By calculating the predicted position based on at least the first reference information, it is possible to calculate a appropriate position for a sequential change in the position of the bounding box 21 in each image included in the first image sequence 12. In particular, the predicted position calculated based on the reference information can be expected to be a position at which the consistency of the annotation is maintained with respect to the first image sequence 12.

Figure 4:
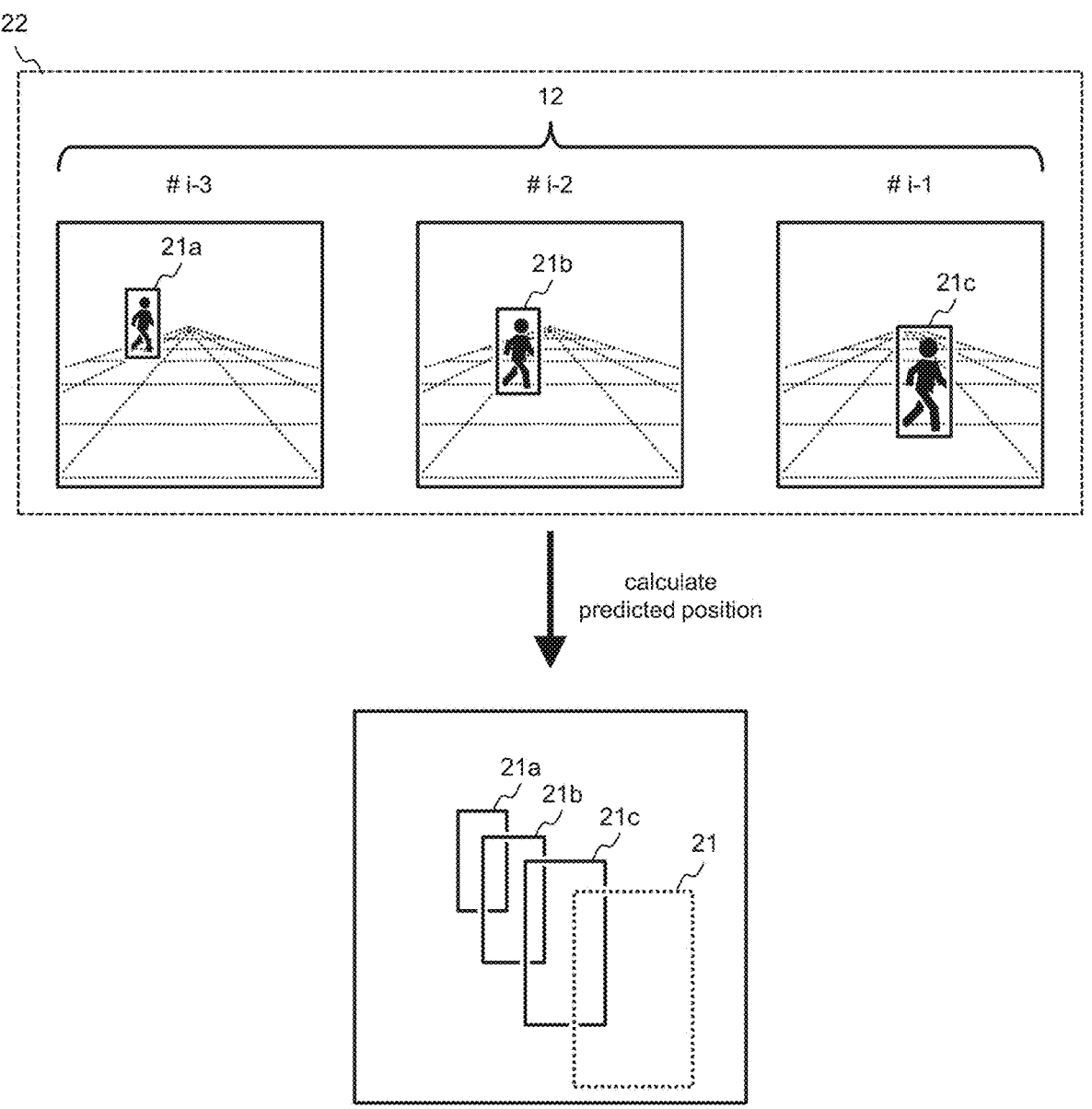
FIG. 4 is a conceptual diagram showing an example of a predicted position calculated in the annotation verification method according to the present embodiment.

FIG. 4 is a conceptual diagram showing an example of the predicted position calculated in the annotation verification method according to the present embodiment. In FIG. 4, the first image sequence 12 is three consecutive images #i−3, #i−2, and #i−1. And in FIG. 4, bounding boxes 21a, 21b, and 21c are shown as an example of the first result 22 for the first image sequence 12. That is, the first reference information is information about the positions of the bounding boxes 21a, 21b, and 21c.

In FIG. 4, an example of the bounding box 21 at the predicted position is shown by a dotted line. The predicted position shown in FIG. 4 is an extrapolation of the positions of the bounding boxes 21a, 21b, and 21c. It is understood that the bounding box 21 at the predicted position is an appropriate position with respect to the change in the positions of the bounding boxes 21a, 21b, and 21c. If the size of the first image sequence 12 is increased, it can be expected that a more accurate position is calculated.

Such calculation of the predicted position can be performed using a regression model in which the reference information is used as the explanatory variables. In this case, the explanatory variables can be represented by M variables corresponding to the images included in the first image sequence 12. For example, when the reference information is the first reference information, the explanatory variables can be represented by the following M vectors wk (k=1, 2, . . . , M). Here, w1, w2, . . . , and wM correspond to the images #i−M, #i−M+1, . . . , #i−1 in the first image sequence 12, respectively. The elements Ptl, Ptr, Pbl, and Pbr of the vector wk are the coordinate positions of the upper left corner, the upper right corner, the lower left corner, and the lower right corner of the bounding box 21 in the corresponding image, respectively. Further, CP is the coordinate position of the centroid of the bounding box 21 in the corresponding image.

$$w_1, w_2, \ldots, w_{M-1}, w_M \qquad \text{Formula 1}$$

-continued $$w_k = [P_{tl}, P_{tr}, P_{bl}, CP] \, (k = 1,2, \ldots , M)$$

The regression model may be configured by a trained machine learning model. In this case, the machine learning model may employ a recurrent neural network (RNN) in which the above M vectors wk are input as time-series data. The vector wk is also referred to as "feature vector".

Figure 5:
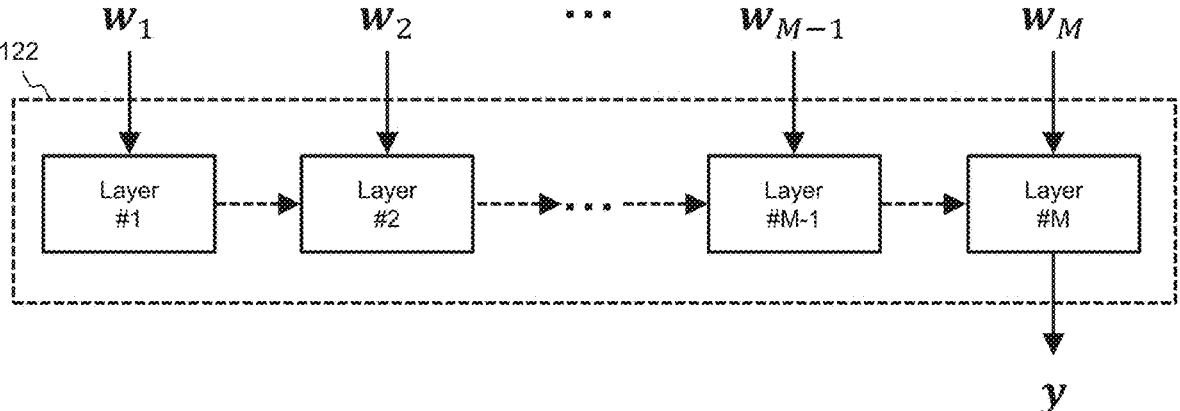
FIG. 5 is a diagram showing an example of a regression model composed by a machine learning model.

FIG. 5 is a diagram showing an example of a regression model 122 configured by a machine learning model. The regression model 122 shown in FIG. 5 is configured by the machine learning model that employs the RNN. That is, each vector wk is input to a corresponding layer, and each layer except for the layer #M at the final stage outputs a hidden state to the next layer. Each layer may be configured by a long short term memory (LSTM). Then, the output y of the layer #M at the final stage is the output of the regression model 122. The output y is, for example, a vector whose elements are the coordinate positions of the four corners and the centroid of the bounding box 21 at the predicted position.

In the annotation verification method according to the present embodiment, in order to improve the accuracy of the predicted position, the reference information may further include information described below.

Figures 6A, 6B:
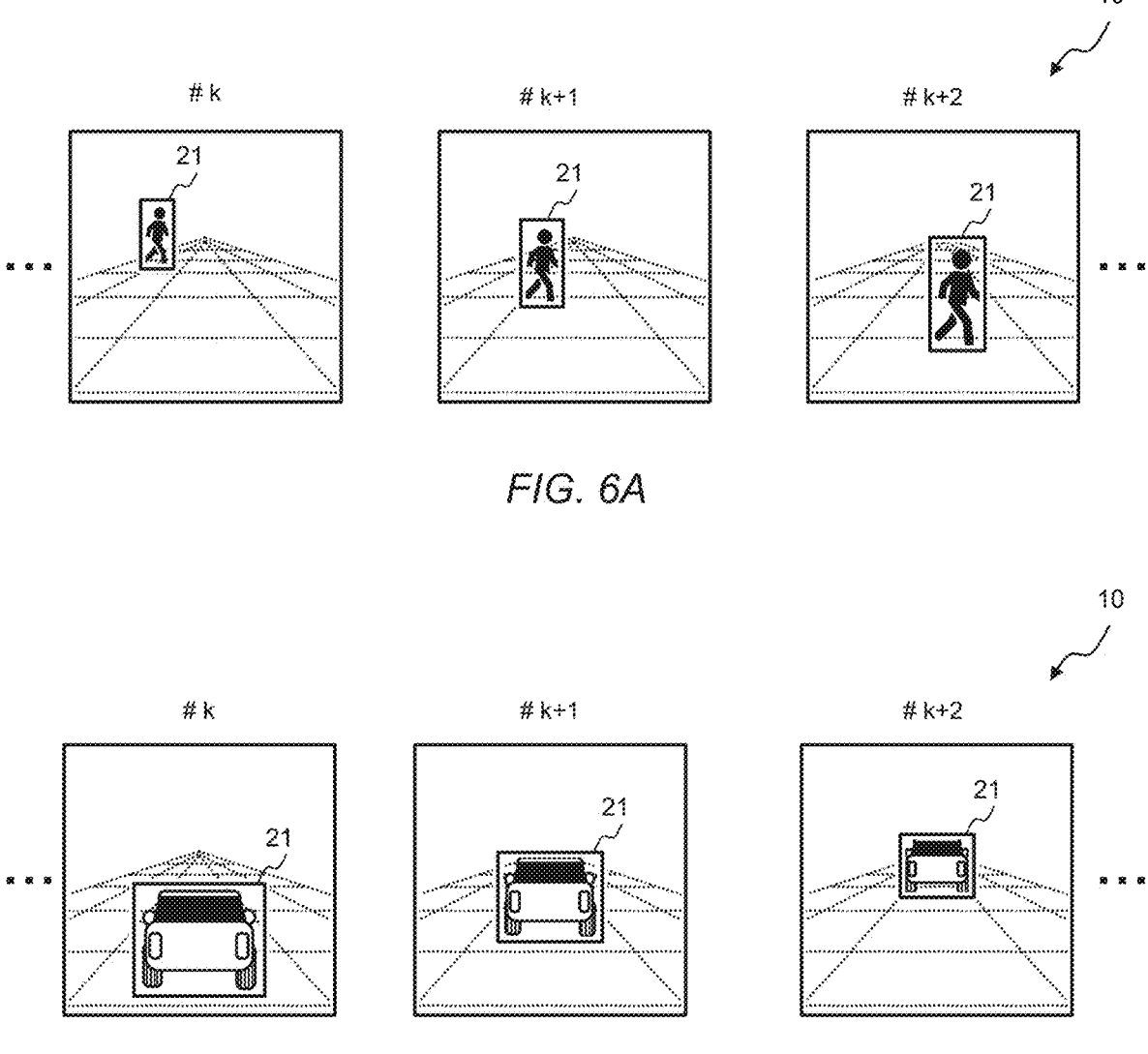
FIG. 6A is a conceptual diagram showing an example of one of two image sequences with different target objects.
FIG. 6B is a conceptual diagram showing an example of one of two image sequences with different target objects.

One of the reference information is information (hereinafter referred to as "second reference information") regarding the class of the target object. For example, the second reference information is information that specifies the class of the target object by a vehicle, a person, an airplane, or the like. The second reference information can be acquired from the annotation result 20, for example. In the image sequence 10, it is considered that the tendency of the change in the position of the target object depends on the class of the target object. FIG. 6A and FIG. 6B are conceptual diagrams showing an example of the image sequences 10 with different target object, respectively. FIG. 6A shows a case where the target object is a person. FIG. 6B shows a case where the target object is a vehicle. As shown in FIG. 6A, when the target object is a person, the position of the person in each image can freely change to some extent as the person walks. In addition, it is considered that the range in which the person reflected in each image changes in accordance with the motion of the person. On the other hand, as shown in FIG. 6B, when the target object is a vehicle, the position and the range of the vehicle reflected in each image tend to change linearly as the vehicle travels. As described above, it is considered that the tendency of the change in the position of the target object reflected in each image depends on the class of the target object. Therefore, by including the second reference information in the reference information, it is possible to take into account the tendency of the change in the position according to the class of the target object in the calculation of the predicted position. In addition, it is possible to improve the accuracy of the predicted position.

Figures 7A, 7B:
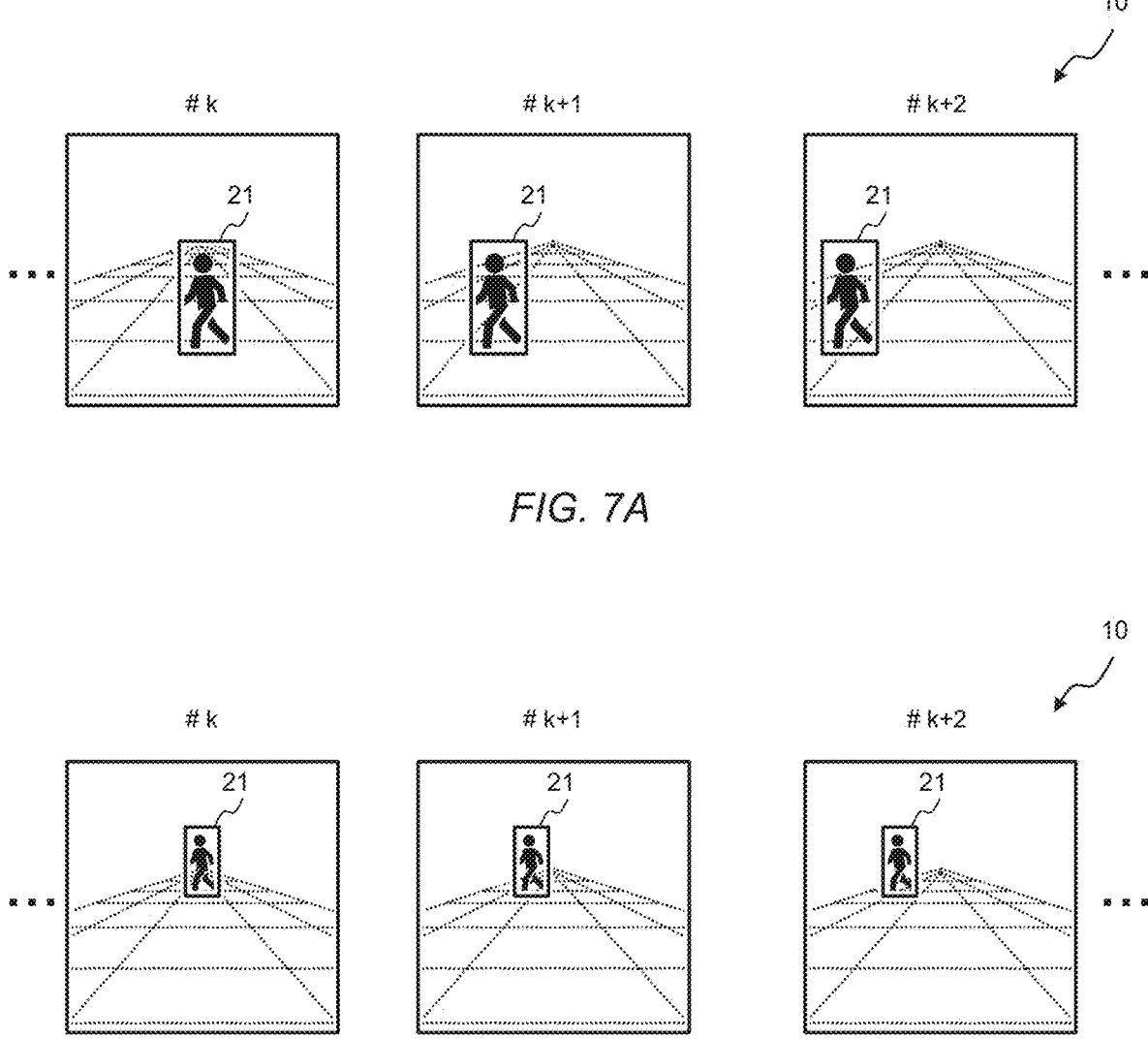
FIG. 7A is a conceptual diagram showing an example of one of two image sequences with different distances from a camera to a target object.
FIG. 7B is a conceptual diagram showing an example of one of two image sequences with different distances from a camera to a target object.

Another piece of reference information (hereinafter referred to as "third reference information") is information regarding the distance from the camera to the target object in each image. For example, the third reference information is depth information of the target object reflected in each image. The third reference information can be acquired from, for example, the position of the bounding box 21 specified in each image and the depth information of each image. The depth information of each image is given as the additional data included in the image sequence 10, for example. Alternatively, the depth information of each image may be calculated from the additional data included in the image sequence 10. In the image sequence 10, the degree of change in the position of the target object depends on the distance from the camera to the target object. FIGS. 7A and 7B are conceptual diagrams showing an example of the image sequences 10 with different distance from the camera to the target object (person), respectively. FIG. 7A shows a case where the distance from the camera to the target object is small, that is a case where the target object is close. FIG. 7B shows a case where the distance from the camera to the target object is large, that is where the target object is far away. As shown in FIG. 7A, when the target object is close, the change in the position of the target object in each image is large. On the other hand, as shown in FIG. 7B, when the target object is far away, the change in the position of the target object in each image is small. As described above, it is considered that the degree of change in the position of the target object depends on the distance from the camera to the target object. Therefore, by including the third reference information in the reference information, it is possible to take into account the degree of change in the position according to the distance from the camera to the target object in the calculation of the predicted position. In addition, it is possible to improve the accuracy of the predicted position.

Figures 8A, 8B:
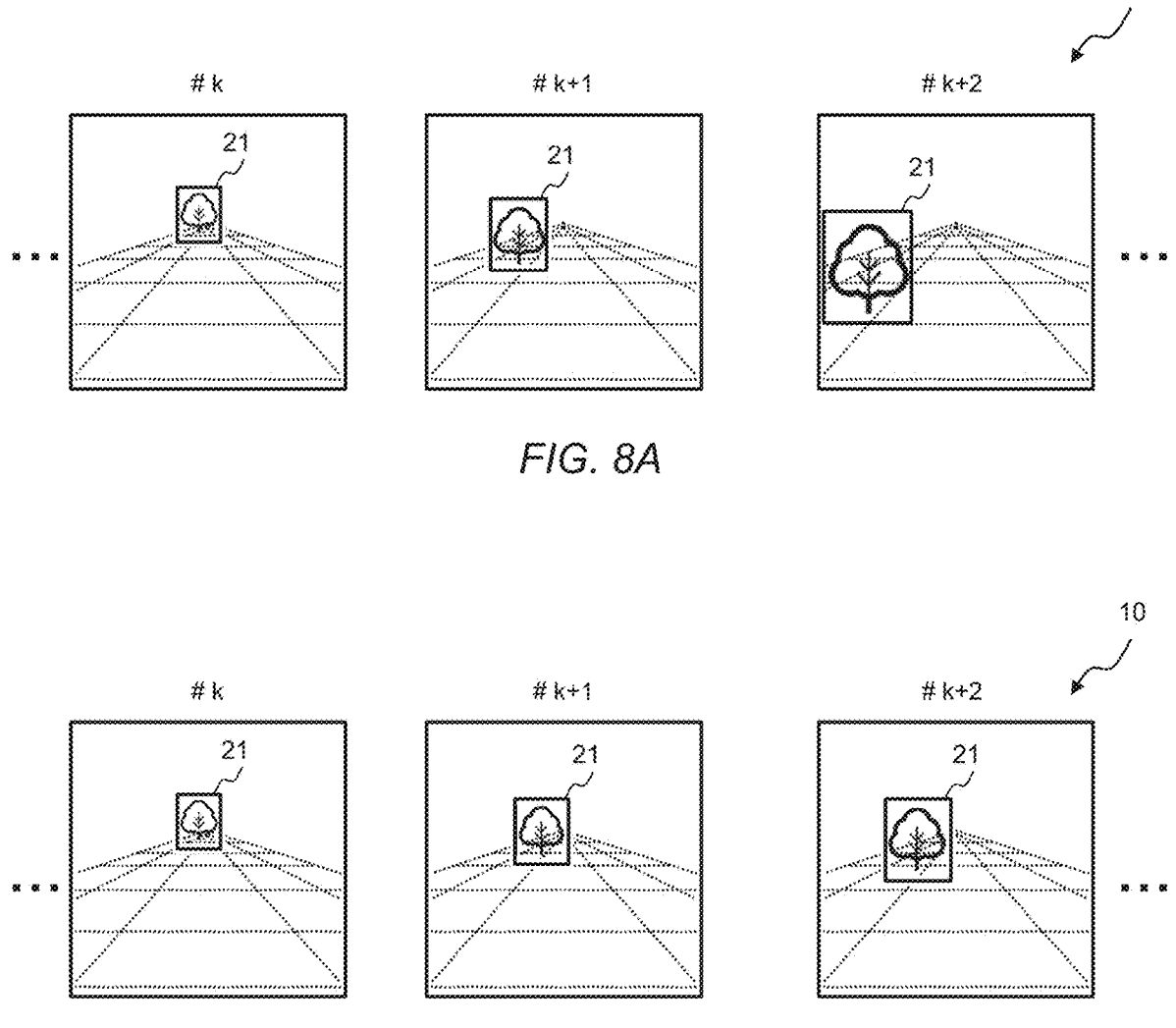
FIG. 8A is a conceptual diagram showing an example of one of two image sequences with different speeds of a moving body when the image sequences are captured by a camera mounted on the moving body.
FIG. 8B is a conceptual diagram showing an example of one of two image sequences with different speeds of a moving body when the image sequences are captured by a camera mounted on the moving body.

Another piece of the reference information is, in a case where the image sequence 10 is captured by a camera mounted on a moving body, information (hereinafter, referred to as "fourth reference information") regarding the speed of the moving body at the time each image was captured. For example, the fourth reference information is information on the vehicle speed at the time when each image was captured by an in-vehicle camera. The information on the vehicle speed is given as, for example, the additional data included in the image sequence 10. In the image sequence 10, the degree of change in the position of the target object depends on the speed of the moving body on which the camera is mounted. FIG. 8A and FIG. 8B are conceptual diagrams showing an example of the image sequences 10 with different speed of the moving body on which the camera is mounted, respectively. FIG. 8A shows a case where the speed of the moving body on which the camera is mounted is high. FIG. 8B shows a case where the speed of the moving body on which the camera is mounted is low. As shown in FIG. 8A, when the speed of the moving body is high, the change in the position of the target object (tree) in each image is large. On the other hand, as shown in FIG. 8B, when the speed of the moving body is low, the change in the position of the target object in each image is small. As described above, it is considered that the degree of change in the position of the target object depends on the speed of the moving body on which the camera is mounted. Therefore, by including the fourth reference information in the reference information, it is possible to take into account the degree of change in the position according to the speed of the moving body on which the camera is mounted in the calculation of the predicted position. In addition, it is possible to improve the accuracy of the predicted position.

When the reference information includes the above-described information, in the case of calculating the predicted position using the regression model 122, the above-described information should be included in the elements of the vector wk which is the explanatory variable. For example, when the reference information further includes the depth information (the third reference information) of the target object reflected in each image, the vector wk may further include the depth information of the target object reflected in the corresponding image as the element.

As described above, in the annotation verification method according to the present embodiment, the predicted position of the bounding box 21 in the target image is calculated based on the reference information.

Further, in the annotation verification method according to the present embodiment, the position (hereinafter referred to as "actually-specified position") of the bounding box 21 actually specified in the target image is acquired from the annotation result 20.

Then, in the annotation verification method according to the present embodiment, the annotation result 20 for the target image is verified by comparing the bounding box 21 at the predicted position with the bounding box 21 at the actually-specified position. In other words, the annotation result 20 for the target image is verified depending on how much the bounding box 21 at the predicted position matches the bounding box 21 at the actually-specified position.

In particular, it is verified whether or not the annotation result 20 for the target image includes anomaly.

Figure 9:
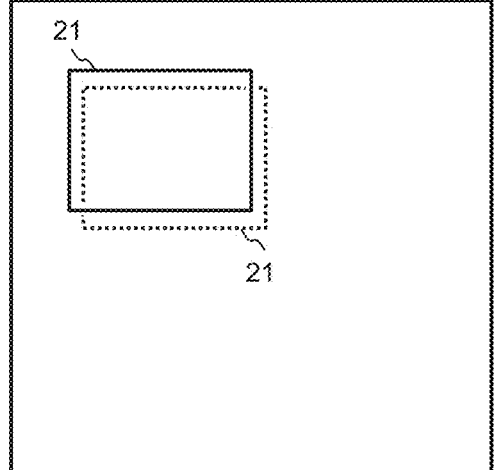
FIG. 9 is a conceptual diagram showing an example of a case where the annotation result for the target image does not include anomaly and a case where the annotation result for the target image includes anomaly in the annotation verification method according to the present embodiment.
Figure 9:
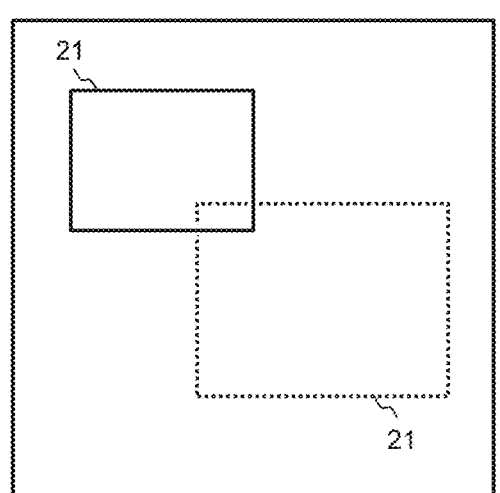

FIG. 9 is a conceptual diagram showing an example of a case where the annotation result 20 for the target image does not include anomaly and a case where the annotation result 20 for the target image includes anomaly in the annotation verification method according to the present embodiment. As shown in FIG. 9, according to the annotation verification method according to the present embodiment, when the bounding box 21 (dotted line) at the predicted position and the bounding box 21 (solid line) at the actually-specified position almost match, it is determined that the annotation result 20 for the target image does not include anomaly. On the other hand, when the bounding box 21 (dotted line) at the predicted position and the bounding box 21 (solid line) at the actually-specified position deviate from each other, it is determined that the annotation result 20 for the target image includes anomaly.

As described above, the annotation verification method according to the present embodiment makes it possible to calculate appropriately the predicted position for the sequential change in the position of the bounding box 21 in the images included in the first image sequence 12. Therefore, by comparing the bounding box 21 at the predicted position with the bounding box 21 at the actually-specified position, it is possible to appropriately verify whether or not the annotation result 20 for the target image includes anomaly. Further, the calculated predicted position can be expected to be a position at which the consistency of the annotation is maintained with respect to the first image sequence 12. Therefore, it is possible to verify whether or not the annotation result 20 for the target image includes anomaly also in terms of the local consistency of the annotation.

Note that the degree of overlap between the bounding box 21 at the predicted position and the bounding box 21 at the actually-specified position can be used as an index to determine how well the bounding box 21 at the predicted position and the bounding box 21 at the actually-specified position match. In this case, when the overlap degree is smaller than a predetermined threshold, it is determined that the annotation result 20 for the target image includes anomaly. The overlap degree may be represented by Intersection over Union (IoU), for example.

By performing the threshold determination using the overlap degree as an index in this way, the verification by comparing between the bounding box 21 at the predicted position with the bounding box 21 at the actually-specified position can be easily realized.

When the verification of the annotation result 20 for the target image is completed, the target image is shifted along the verification direction and the above steps are repeated. In the case shown in FIG. 3, when the verification with the image #i as the target image is completed, the image #i+1 becomes the next target image. At this time, the first image sequence 12 is composed of M consecutive images from #i−M+1 to #i. The first image sequence 12 may be selected excluding images for which the annotation result 20 includes anomaly. For example, when it is determined that the annotation result 20 for the image #i includes anomaly, the first image sequence 12 when the image #i+1 is set as the target image may be M consecutive images from #i−M to #i−1. By selecting the first image sequence 12 in this way, it is possible to suppress a decrease in the accuracy of the predicted position.

In this way, in the annotation verification method according to the present embodiment, the annotation result 20 for each image included in the image sequence 10 is sequentially verified. The verification result by the annotation verification method according to the present embodiment is generated so as to give a determination result of whether or not the annotation result 20 for each image includes anomaly. For example, the verification result is data managed for each image with an anomaly determination flag that becomes TRUE when it is determined that the annotation result 20 includes anomaly, as shown in the following table. In the example of the verification result described below, it is determined that the annotation result 20 for the image #2 includes anomaly. The verification result may be added to the annotation result 20 or the image sequence 10 as data. Alternatively, the verification result may be provided to a user as data.

TABLE 1

| IMAGE | ANOMALY DETERMINATION FLAG |
|-------|----------------------------|
| #1 | FALSE |
| #2 | TRUE |
| #3 | FALSE |

As described above, according to the present embodiment, the first reference information regarding the position of the bounding box 21 in each image included in the first image sequence 12 adjacent to the target image is acquired. And, the predicted position of the bounding box 21 in the target image is calculated based on the reference information including the first reference information. Then, the annotation result 20 for the target image is verified by comparing the bounding box 21 at the predicted position with the bounding box 21 at the actually-specified position. It is thus possible to appropriately verify the annotation result 20 for the target image. Further, by shifting the target image along a predetermined verification direction, the annotation result 20 for each image included in the image sequence 10 can be sequentially verified. Therefore, by executing the annotation verification method according to the present embodiment by a computer, it is possible to easily verify the annotation result 20 for each image included in the image sequence 10.

Further, according to the present embodiment, the first reference information can be acquired from the annotation result 20. Therefore, the annotation verification method according to the present embodiment can perform verification as long as at least the annotation result 20 is given. Furthermore, according to the present embodiment, the annotation result 20 can be verified without the need for comparison with the annotation result 20 or the like by another annotator 1.

Note that, according to the present embodiment, it is assumed that the annotation result 20 for each image included in the first image sequence 12 has been verified. Therefore, each image in the first image sequence 12 with respect to the initial target image may have the annotation result 20 verified by other means. For example, in the case shown in FIG. 3, with respect to the image #M+1 which is the first target image, the annotation result 20 for M images #1 to #M included in the first image sequence 12 may have been verified by another means. The verification by other means may be manual verification. In this case, according to the present embodiment, the annotation result 20 for each image included in the image sequence 10 can be easily verified by only manually verifying the annotation result 20 for the images of the size of the first image sequence 12.

1-2. Annotation Verification Apparatus

The annotation verification method according to the present embodiment is realized by processes executed by a computer. Hereinafter, an annotation verification apparatus for performing the annotation verification method according to the present embodiment will be described.

Figure 10:
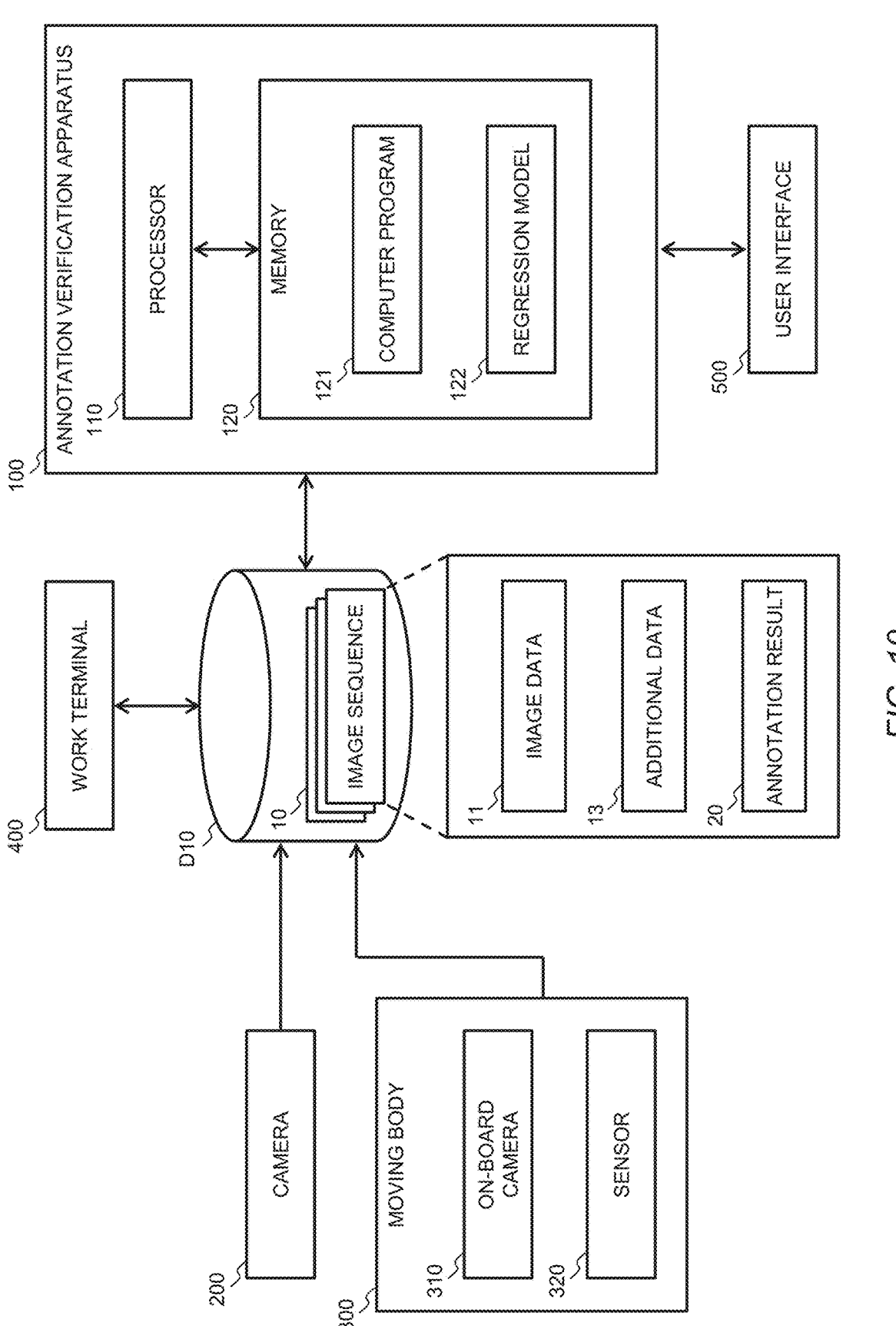
FIG. 10 is a diagram showing an example of a configuration of an annotation verification apparatus according to the present embodiment.

FIG. 10 is a block diagram showing an example of a configuration of an annotation verification apparatus 100 according to the present embodiment. The annotation verification apparatus 100 is configured to be able to access the image database D10. For example, the annotation verification apparatus 100 is connected to a server that stores the image database D10 via the Internet. Alternatively, the annotation verification apparatus 100 may be configured to store the image database D10 in a memory 120.

The image database D10 manages the image sequence 10 captured by a camera 200 or an onboard camera 310.

The image sequence 10 stored in the image database D10 includes image data 11, additional data 13, and the annotation result 20.

The image data 11 is data representing each image included in the image sequence 10. The additional data 13 is data representing additional information regarding each image included in the image sequence 10.

The camera 200 may be of various forms. Examples of the camera 200 include a video camera, a monitoring camera, and a live camera. The image sequence 10 captured by the camera 200 is uploaded to the image database D10 as appropriate. The camera 200 may be configured to sequentially upload captured images to the image database D10.

The onboard camera 310 is mounted on a moving body 300. Examples of the moving body 300 include a vehicle and a drone. The moving body 300 includes a sensor 320 that detects the state and the surrounding environment of the moving body 300. Examples of the sensor 320 include a LIDAR (Light Detection And Ranging), an IMU (Inertial Measurement Unit), a speed sensor, an GPS receiver, or the like. Examples of information detected by the sensor 320 include the speed of the moving body 300, the position of the moving body 300, and the distance between the moving body 300 and the surrounding object. The moving body 300 uploads the image sequence 10 captured by the onboard camera 310 to the image database D10 as appropriate. Further, the moving body 300 may be configured to upload the information detected by the sensor 320 to the image database D10 as the additional data 13 of the image sequence 10. For example, the moving body 300 uploads the speed of the moving body 300 at the time each image included in the image sequence 10 was captured to the image database D10 as the additional data 13.

The work terminal 400 is a device for performing annotation on the image sequence 10 managed by the image database D10. The work terminal 400 reads the image sequence 10 from the image database D10. Then, the annotator 1 operates the work terminal 400 to perform annotation on the read image sequence 10. The work terminal 400 uploads the annotation result 20 of the annotation to the image database D10.

The user interface 500 provides an interface for a user of the annotation verification apparatus 100. For example, the user interface 500 is configured by an input device such as a keyboard, a mouse, or a touch panel, and an output device such as a display or a speaker.

The annotation verification apparatus 100 according to the present embodiment reads the image sequence 10 managed by the image database D10 and executes processes of verifying the annotation result 20 for the read image sequence 10 by the above-described annotation verification method. The image sequence 10 to be read may be determined by the user via the user interface 500, for example. Alternatively, the annotation verification apparatus 100 may be configured to refer to the image database D10 and sequentially read the image sequence 10 to which the annotation result 20 is added. The verification result by the annotation verification apparatus 100 is, for example, transmitted to the image database D10, and is added to the corresponding image sequence 10. Alternatively, the verification result is provided to the user via the user interface 500.

The annotation verification apparatus 100 according to the present embodiment is a computer including one or more processors 110 (hereinafter, simply referred to as "processor 110" or "processing circuitry") and one or more memories 120 (hereinafter, simply referred to as "memory 120"). The processor 110 executes various processes. The processor 110 may be configured by, for example, a central processing unit (CPU) including an arithmetic device, a register, and the like. The memory 120 is connected to the processor 110 and stores various kinds of information necessary for the processor 110 to execute processes. The memory 120 may be configured by a recording medium such as a read only memory (ROM), a random-access memory (RAM), a hard disk drive (HDD), a solid-state drive (SSD), or the like.

The memory 120 stores a computer program 121 and the regression model 122.

The computer program 121 may be stored in a computer-readable recording medium. The computer program 121 includes a plurality of instructions configured to cause the processor 110 to execute various processes. The processor 110 operates in accordance with the plurality of instructions, and thus the processor 110 executes various processes.

1-3. Processes

Hereinafter, processes executed by the annotation verification apparatus 100, more specifically, process executed by the processor 110 will be described.

Figure 11:
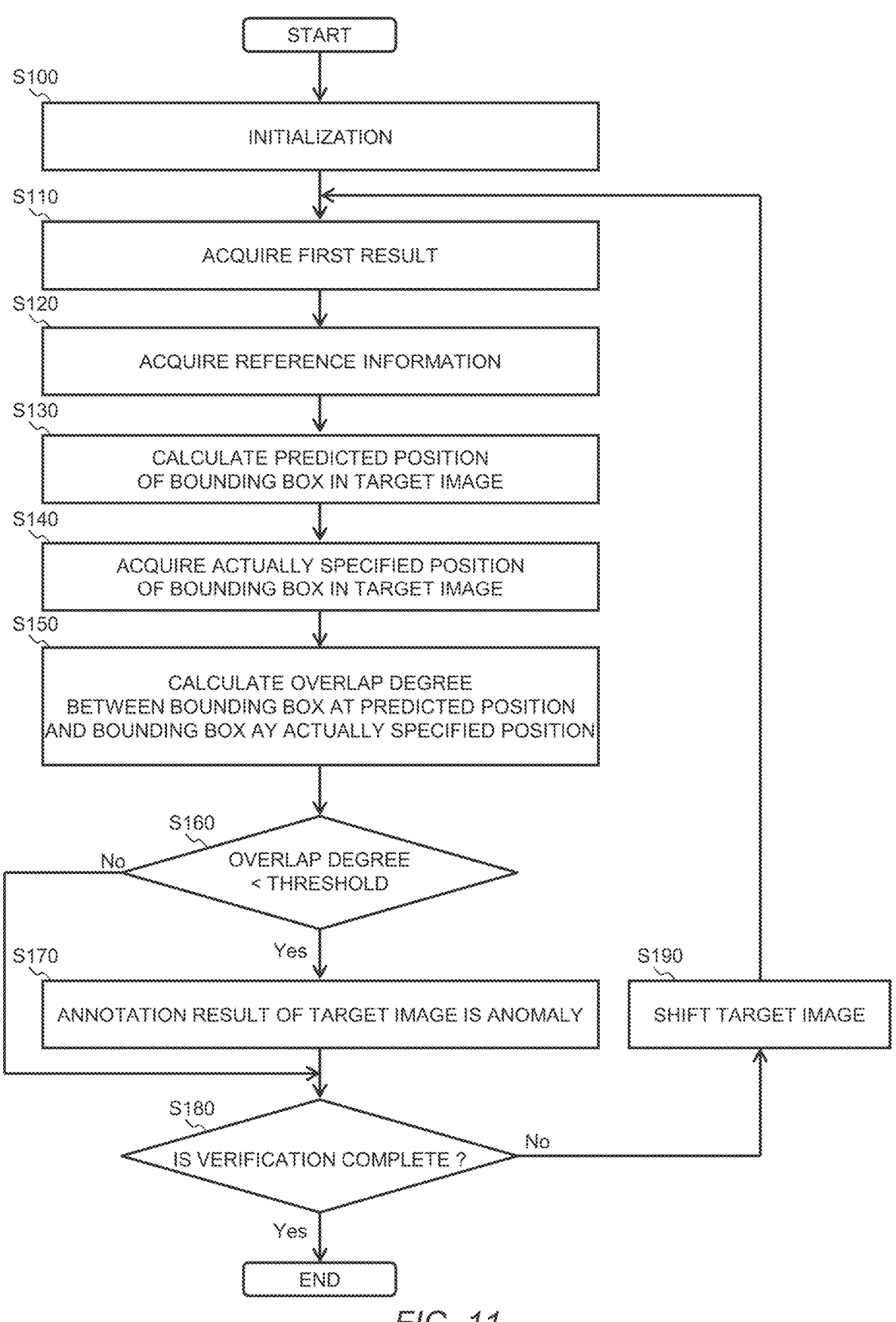
FIG. 11 is a flowchart showing an example of processes executed by the annotation verification apparatus according to the present embodiment.

FIG. 11 is a flowchart showing an example of the processes executed by the processor 110. The process shown in FIG. 11 is started, for example, when the image sequence 10 to be target is read in response to a request to start execution.

In step S100, the processor 110 executes an initialization process. In the initialization process, the processor 110 acquires various kinds of information such as the additional data 13 and the annotation result 20, determines the first target image, and confirms the verification direction, and so on.

Next, in step S110, the processor 110 selects the first image sequence 12 adjacent to the target image, and acquires the verified first result 22 for the first image sequence 12.

Next, in step S120, the processor 110 acquires the reference information. At least in step S120, the processor 110 acquires the first reference information from the first result 22 acquired in step S110. Further, in step S120, the processor 110 may acquire the second reference information, the third reference information, or the fourth reference information from the additional data 13 or the first result 22.

Next, in step S130, the processor 110 calculates the predicted position of the bounding box 21 in the target image based on the reference information acquired in step S120.

Next, in step S140, the processor 110 acquires the actually-specified position of the bounding box 21 in the target image.

Next, in step S150, the processor 110 calculates the overlap degree of the bounding box 21 at the predicted position and the bounding box 21 at the actually-specified position.

Next, in step S160, the processor 110 determines whether or not the overlap degree calculated in step S150 is smaller than a predetermined threshold. The predetermined threshold may be suitably given according to the environment to which the present embodiment is applied.

When the overlap degree is smaller than the predetermined threshold (step S160; Yes), the processor 110 determines that the annotation result 20 for the target image includes anomaly (step S170). For example, the processor sets the anomaly determination flag corresponding to the target image to TRUE. Thereafter, the process proceeds to step S180.

If the overlap degree is equal to or larger than the predetermined threshold (step S160; No), the processor determines that the annotation result 20 for the target image does not include anomaly, and the process proceeds to step S180.

In step S180, the processor 110 determines whether or not to end the verification. For example, the processor 110 determines to end the verification on condition that the verification of the annotation result 20 for all the images included in the image sequence 10 is completed.

When it is determined that the verification is to be ended (step S180; Yes), the process is ended.

When it is determined that the verification is not to be ended (step S180; No), the processor 110 shifts the target image (step S190). Thereafter, the processor 110 repeats the processes from step S110 again.

As described above, the processor 110 executes the processes, and thereby the function of the annotation verification apparatus 100 according to the present embodiment is realized. Further, the processor 110 executes the processes in this way, and thereby the annotation verification method according to the present embodiment is implemented. Further, an annotation verification program according to the present embodiment is realized by the computer program 121 that causes the processor 110 to execute the processes in this way.

2. Second Embodiment

Hereinafter, a second embodiment will be described. In the following description, parts that overlap with the above description are omitted as appropriate.

2-1. Outline

When annotating the image sequence 10, a plurality of annotators 1 may perform the annotation for the same image sequence 10. In this case, the annotation result 20 for the image sequence 10 includes each result of the annotation by each of the plurality of annotators 1. It is normally considered that the annotation result 20 of each of the plurality of annotators 1 is different from each other due to the skill, tendency, and the like of each annotator 1.

Figure 12:
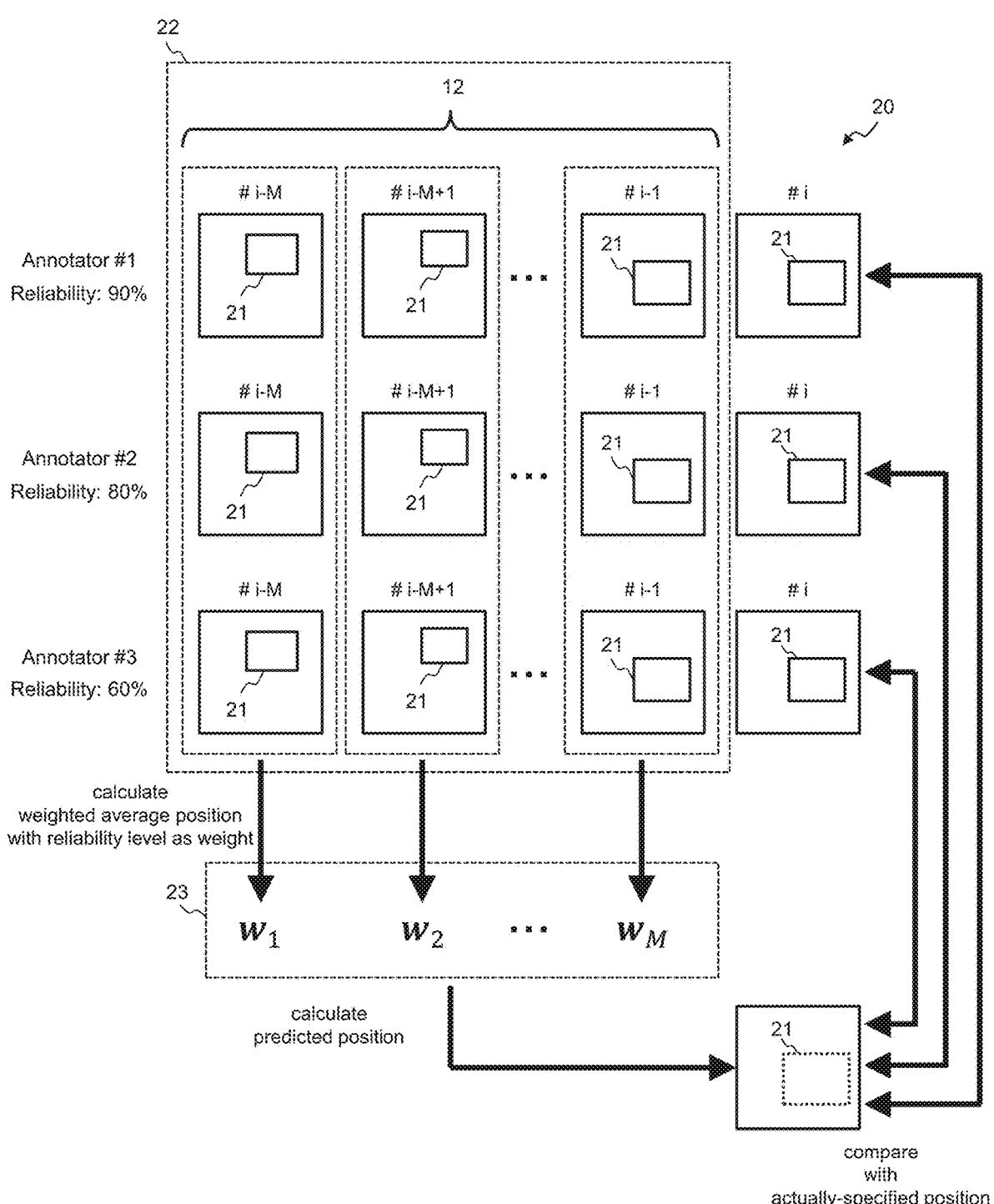
FIG. 12 is a conceptual diagram for explaining an outline of an annotation verification method according to the second embodiment.

The annotation verification method according to the second embodiment is applied to a case where a plurality of annotators 1 perform annotation on the same image sequence 10. Hereinafter, an outline of the annotation verification method according to the second embodiment will be described with reference to FIG. 12. FIG. 12 conceptually shows the annotation result 20 of each of three annotators #1, #2, and #3 for the same image sequence 10.

In the annotation verification method according to the second embodiment, a reliability level of annotation for each of a plurality of annotators 1 is managed. The reliability level of each annotator 1 is a value for estimating the correctness of the annotation by each annotator 1. In FIG. 12, the reliability levels of the annotators #1, #2, and #3 are given as 90%, 80%, and 60%, respectively. That is, the annotation by the annotator #1 is estimated to be correct at 90%, and the annotation by the annotator #3 is estimated to be correct at 60%. The reliability level is not limited to a percentage. For example, the reliability level may be represented by a decimal.

The reliability level of each annotator 1 can be given by updating it based on a verification result by the annotation verification method, as will be described later. In this case, the initial value of the reliability level of each annotator 1 may be preferably given. In addition, the reliability level of each annotator 1 may be given by using the number of times of annotation, the number of years of experience, or the like as an index.

The annotation verification method according to the second embodiment sequentially verifies the annotation result 20 of each of the plurality of annotators 1 for each image included in the image sequence 10 in accordance with a predetermined verification direction. In FIG. 12, the verification direction is in ascending order. In FIG. 12, a case where the image #i is set as the target image will be described.

Firstly, in the annotation verification method according to the second embodiment, the first result 22 is acquired. In the second embodiment, the first result 22 includes the verified annotation result 20 of each of the plurality of annotators 1 for the first image sequence 12.

Next, in the annotation verification method according to the second embodiment, the reliability level of each of the plurality of annotators 1 is acquired. Then, in the annotation verification method according to the second embodiment, the first reference information is acquired from the first result 22 and the reliability level of each of the plurality of annotators 1.

In the second embodiment, the first reference information is a weighted average position 23 of the positions of the bounding boxes 21 spefied by the plurality of annotators 1 for each image included in the first image sequence 12. In particular, the weight related to the calculation of the weighted average position 23 is the reliability level of each of the plurality of annotators 1.

In FIG. 12, the weighted average position 23 is represented by a vector wk (k=1, 2, . . . , M). For example, w1 is a vector whose elements are weighted averages of the coordinate positions of the four corners and the centroid of the bounding box 21 specified by the annotators #1, #2, and #3 for the image #i-M. For example, the vector wk (k=1, 2, . . . , M) can be expressed by the following equation. Here, a 1, a 2, and a 3 are the reliability levels of the annotators #1, #2, and #3, respectively. Further, v1k, v2k, and v3k are vectors whose elements are the coordinate positions of the four corners and the centroid of the bounding box 21 specified for the corresponding image by the annotators #1, #2, and #3, respectively.

$$w_k = \frac{\alpha_1 * v_{1k} + \alpha_2 * v_{2k} + \alpha_3 * v_{3k}}{\alpha_1 + \alpha_2 + \alpha_3} \ (k = 1,2, \dots , M) \qquad \text{Formula 2}$$

Next, in the annotation verification method according to the second embodiment, the predicted position of the bounding box 21 in the target image is calculated based on the reference information including the first reference information. The calculation of the predicted position may be the same as that in the first embodiment. That is, the predicted position may be calculated using the regression model 122 in which the reference information including the weighted average position 23 as the first reference information is set as the explanatory variable. The reference information may include the second reference information, the third reference information, or the fourth reference information.

Next, in the annotation verification method according to the second embodiment, the actually-specified position of the bounding box 21 in the target image is acquired for each of the plurality of annotators 1 from the annotation result 20 of each of the plurality of annotators 1.

Then, in the annotation verification method according to the second embodiment, the annotation result 20 for the target image is verified by comparing the bounding box 21 at the predicted position in the target image with the bounding box 21 at the actually-specified position for each of the plurality of annotators 1. The bounding box 21 at the predicted position is common in the verification with respect to each of the plurality of annotators 1. The comparison method in the verification with respect to each of the plurality of annotators 1 may be the same as that in the first embodiment. In particular, the comparison in the verification with respect to each of the plurality of annotators 1 may be performed using the overlap degree between the bounding box 21 at the predicted position and the bounding box 21 at the actually-specified position in the target image as an index.

When the verification of the annotation result 20 for the target image is completed for each of the plurality of annotators 1, the target image is shifted along the verification direction and the above steps are repeated.

In this way, in the annotation verification method according to the second embodiment, the annotation result 20 for each image included in the image sequence 10 is sequentially verified for each of the plurality of annotators 1.

In the annotation verification method according to the second embodiment, the reliability level of each of the plurality of annotators 1 is updated based on the verification result. Typically, the reliability level of the annotator 1 whose the annotation result 20 includes anomaly in the verification result is decreased. Furthermore, the reliability level of the annotator 1 whose the annotation result 20 does not include anomaly (the annotation result 20 is normal) in the verification result may be increased. The reliability level may be updated each time the verification of the annotation result 20 for the target image is completed, or may be updated when the verification of the annotation result 20 for each image is completed.

When updating the reliability level of the annotator 1, a change amount of the reliability level may be adjusted according to the difficulty level of the annotation. The difficulty level of the annotation is a value representing the difficulty for the annotator 1 to correctly perform annotation.

The difficulty level of the annotation may use the size of the target object as one index. For example, when the target object is a small object such as a pebble, the difficulty level of the annotation is set to be high.

The difficulty level of the annotation may use the degree of freedom of movement of the target object as one index. For example, when the target object is a flying object such as a bird or an airplane, the difficulty level of the annotation is set to be high.

The difficulty level of the annotation may use the ease of distinguishing the target object in the image as one index. For example, when the class of the target object is confusing with another class that is not the target object (for example, a van and an SUV, a sidewalk and a bicycle road, or the like), the difficulty level of the annotation is set to be high.

The difficulty level of the annotation may use the appearance of the image as one index. For example, the lower the brightness or contrast of the image, the higher the difficulty level of the annotation is set.

The difficulty level of the annotation may use the degree of difference in the annotation result 20 among the plurality of annotators 1 as one index. In this case, the degree of difference in the annotation result 20 among the plurality of annotators 1 may use Krippendorf's alpha coefficient. For example, the larger the a coefficient is, that is, the smaller the difference in the annotation result 20 among the plurality of annotators 1 is, the higher the difficulty level of the annotation is set.

The difficulty level of the annotation may be calculated by a learned machine learning model using an image as an input. In this case, the machine learning model is configured by, for example, a Convolutional Neural Network (CNN).

The difficulty level of the annotation may be set for the image sequence 10 or may be individually set for each image included in the image sequence 10.

The adjustment of the amount of change in the reliability level according to the difficulty level of the annotation is performed as shown in the following table, for example. However, the amount of change in the reliability level may be adjusted in more stages or continuously with respect to the difficulty level of the annotation. By adjusting the amount of change in the reliability level in accordance with the difficulty level of the annotation in this way, the reliability level of each of the plurality of annotators 1 can be managed more accurately.

TABLE 2

| | | VERIFICATION RESULT | |
| | | NOT ANOMALY | ANOMALY |
| --- | --- | --- | --- |
| DIFFICULTY LEVEL | HIGH | LARGE INCREASE | SMALL DECREASE |
| | LOW | SMALL INCREASE | LARGE DECREASE |

As described above, according to the second embodiment, the predicted position of the bounding box 21 in the target image is calculated based on the reference information including the weighted average position 23 as the first reference information. Then, for each of the plurality of annotators 1, the annotation result 20 for the target image is verified by comparing the bounding box 21 at the predicted position with the bounding box 21 at the actually-specified position. Further, by shifting the target image along a predetermined verification direction, the annotation result 20 for each image included in the image sequence 10 is sequentially verified for each of the plurality of annotators 1. Thus, when the plurality of annotators 1 are annotating the same image sequence 10, it is possible to verify the annotation result 20 while maintaining verification efficiency. In particular, since the weighted average position 23 is calculated using the reliability level of each of the plurality of annotators 1 as a weight, it is possible to verify the annotation result 20 of each of the plurality of annotators 1 while taking into account the skill of each annotator 1.

Furthermore, according to the second embodiment, the reliability level of each of the plurality of annotators 1 is updated based on the verification result. It is thus possible to dynamically manage the reliability level of each of the plurality of annotators 1.

2-2. Annotation Verification Apparatus

Hereinafter, an annotation verification apparatus 100 for performing the annotation verification method according to the second embodiment will be described.

Figure 13:
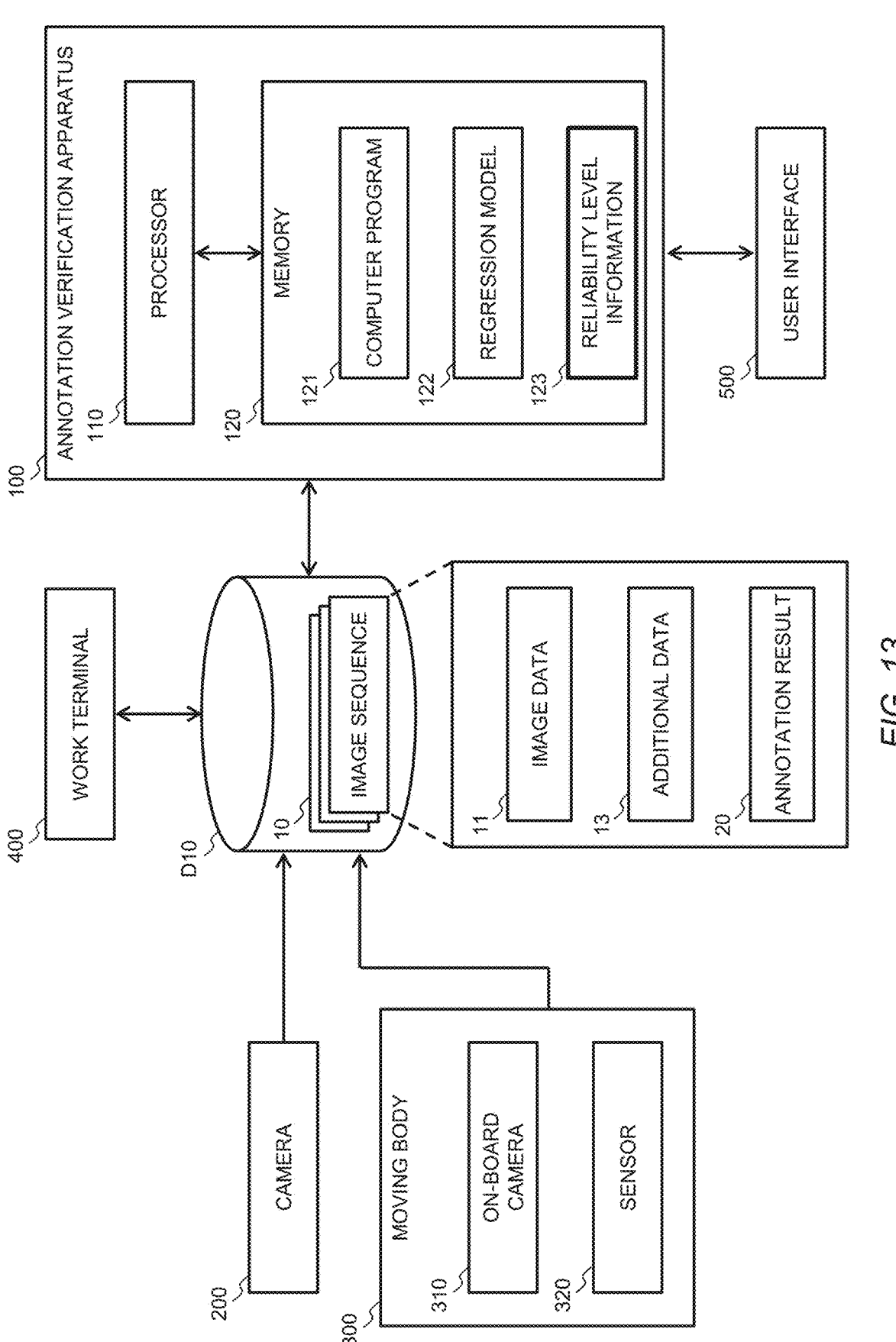
FIG. 13 is a diagram showing an example of a configuration of an annotation verification apparatus according to the second embodiment.

FIG. 13 is a block diagram showing an example of a configuration of the annotation verification apparatus 100 according to the second embodiment. In the second embodiment, reliability level information 123 is stored in the memory 120, compared to the first embodiment.

The reliability level information 123 manages the reliability level of each annotator 1. For example, the reliability level information 123 is data in which identification information of each annotator 1 and the reliability level of each annotator 1 are linked. The reliability level information 123 is updated and managed by the processes executed by the processor 110.

2-3. Processes

Hereinafter, processes executed by the annotation verification apparatus 100 according to the second embodiment, more specifically, processes executed by the processor 110 will be described.

Figure 14:
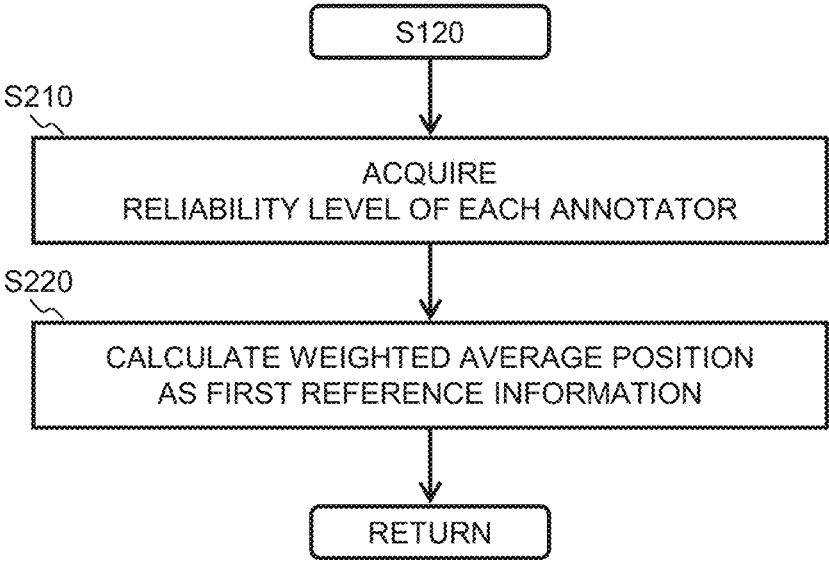
FIG. 14 is a flowchart showing an example of processes executed by the annotation verification apparatus according to the second embodiment.

The processes executed by the processor 110 according to the second embodiment may be equivalent to the processes shown in FIG. 11. However, the processes for step S140 to step S170 are executed for each of the plurality of annotators 1. In addition, in step S120, the processor 110 according to the second embodiment executes at least the following processes shown in FIG. 14.

In step S210, the processor 110 acquires the reliability level of each of the plurality of annotators 1. For example, the processor 110 acquires the reliability level of each annotator 1 by referring to the reliability level information 123 using the identification information of each annotator 1.

Next, in step S220, the processor 110 calculates a weighted average position 23 as the first reference information based on the first result 22 acquired in step S110 and the reliability level of each of the plurality of annotators I acquired in step S210.

What is claimed is:

1. An annotation verification method of verifying a result of annotation for an image sequence, the annotation being a process of specifying a target object range surrounding a target object in each image included in the image sequence by an annotator, the annotation verification method, which is executed by a computer, comprising:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

2. The annotation verification method according to claim 1, wherein the verifying the result of the annotation for the target image includes:

calculating a degree of overlap between the target object range at the predicted position and the target object range at the actually-specified position; and when the degree of overlap is less than a threshold, determining that the result of the annotation for the target image includes anomaly.

3. The annotation verification method according to claim 1, further comprising acquiring second reference information regarding a class of the target object, wherein the reference information further includes the second reference information.

4. The annotation verification method according to claim 1, wherein the image sequence is captured by a camera, the annotation verification method further comprises acquiring third reference information regarding a distance from the camera to the target object in each image included in the first image sequence, and the reference information further includes the third reference information.

5. The annotation verification method according to claim 1, wherein the image sequence is captured by a camera installed on a moving object, the annotation verification method further comprises acquiring fourth reference information regarding a speed of the moving object when each image included in the first image sequence is captured, and the reference information further includes the fourth reference information.

6. The annotation verification method according to claim 1, wherein the annotation is performed by a plurality of annotators, the acquiring the first reference information includes:

acquiring a reliability level of the annotation for each of the plurality of annotators; and calculating, for each image included in the first image sequence, a weighted average position of positions of the target object range respectively specified by the plurality of annotators by using the reliability level as weights, and the first reference information is the weighted average position for each image included in the first image sequence.

7. The annotation verification method according to claim 6, further comprising updating the reliability level based on a result of the verifying the result of the annotation for the target image.

8. The annotation verification method according to claim 7, wherein the updating the reliability level includes:

calculating a difficulty level of the annotation; and adjusting an amount of change in the reliability level depending on the difficulty level when updating the reliability level.

9. An annotation verification apparatus of verifying a result of annotation for an image sequence, the annotation being a process of specifying a target object range surrounding a target object in each image included in the image sequence by an annotator, the annotation verification apparatus comprising processing circuitry being configured to execute:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

10. A non-transitory computer readable recording medium on which a computer program for verifying a result of annotation for an image sequence is recorded, the annotation being a process of specifying a target object range surrounding a target object in each image included in the image sequence by an annotator, the computer program, when executed by a computer, causing the computer to execute:

acquiring a first result which is a verified result of the annotation for a first image sequence included in the image sequence;

acquiring first reference information regarding a position of the specified target object range in each image included in the first image sequence based on the first result;

predicting a position of the target object range in a target image adjacent to the first image sequence based on reference information including the first reference information;

acquiring an actually-specified position of the target object range in the target image based on the result of the annotation for the target image; and verifying the result of the annotation for the target image by comparing the target object range at the predicted position and the target object range at the actually-specified position.

* * * * *